United States Patent
Kwatra

(10) Patent No.: US 7,155,624 B2
(45) Date of Patent: Dec. 26, 2006

(54) POWERED NEWCARD CONNECTOR

(75) Inventor: Ajay Kwatra, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 471 days.

(21) Appl. No.: 10/675,485

(22) Filed: Sep. 30, 2003

(65) Prior Publication Data

US 2005/0071695 A1   Mar. 31, 2005

(51) Int. Cl.
*G06F 1/26*   (2006.01)

(52) U.S. Cl. .................................... 713/330; 710/301

(58) Field of Classification Search ............... 713/300, 713/330; 710/300, 301
See application file for complete search history.

(56) References Cited

U.S. PATENT DOCUMENTS

| | | | |
|---|---|---|---|
| 5,781,747 A | 7/1998 | Smith et al. | |
| 5,831,821 A | 11/1998 | Scholder et al. | |
| 5,999,998 A * | 12/1999 | Bailis | 710/302 |
| 6,118,668 A | 9/2000 | Scholder et al. | |
| 6,178,474 B1 | 1/2001 | Hamano et al. | |
| 6,256,208 B1 | 7/2001 | Supinski et al. | |
| 6,968,470 B1 * | 11/2005 | Larson et al. | 713/340 |
| 6,981,068 B1 * | 12/2005 | Harari et al. | 710/2 |

* cited by examiner

*Primary Examiner*—Thuan Du
(74) *Attorney, Agent, or Firm*—Haynes and Boone, LLP

(57) ABSTRACT

In a method and system for transferring power from a first subsystem to a second subsystem of a computer via a Newcard device, a first port of the device having a first connector is used to electrically connect the first subsystem to the device. The first connector includes at least one pin terminal to transfer the power and at least one pin terminal coupled to an SMbus of the computer. A second port of the device having a second connector is used to electrically couple the device to the second subsystem. The second connector includes at least one pin terminal to transfer the power. An identifier stored in the device is read by the first subsystem to uniquely identify the device. In response to the identifier, the first subsystem controls an amount of the power transferred to the device.

22 Claims, 7 Drawing Sheets

POWERED NEWCARD CONNECTOR

CROSS-REFERENCE TO RELATED APPLICATION

This application is related to U.S. patent application Ser. No. 10/675,396, filed Sep. 30, 2003 and entitled "Chassis Expansion Using Newcard" by applicant Ajay Kwatra. The entire content of this application is incorporated herein by this reference.

BACKGROUND

The present disclosure relates generally to information handling systems, and more particularly to techniques for improving expansion capabilities of a computer included in an information handling system.

As the value and use of information continues to increase, individuals and businesses seek additional ways to acquire, process and store information. One option available to users is information handling systems. An information handling system ('IHS') generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In order to increase the potential capabilities and/or the functionality of computers, it is common practice to add corresponding new hardware to empty slots, if available. In these cases, typically the plug-and-play functionality of the computer automatically detects the new hardware and assists the user in configuring or setting up the new device. A main chassis typically includes the motherboard of the computer. If no empty slots are available, it is common practice to add, extend or split the main chassis to a new expansion chassis having additional expansion slots. Expansion slots allow expansion cards to be inserted into the computer such that the circuitry of the new cards becomes part of the overall computer system. For example, expansion cards may be added for functions such as additional memory, specialized interfaces for communicating with external devices or networks, circuitry for improved multimedia effects, circuitry for removable storage devices, and many other capabilities that can be desirous in various applications. In order to add an expansion card to a system, the card is typically inserted into an expansion slot and then mounted to the original chassis of the computer with a mounting bracket.

In the past few years there has been an increased demand for smaller and lighter form factors in the portable as well as desktop computing environments. The smaller form factor often results in a limited number of peripherals and/or spare slots being available to a user for adding new hardware. Thus, the trend towards smaller and lighter form factors often results in the user requiring additional mounting space to accommodate new hardware.

Power consumed by the processors included in the computers is increasing from one technology generation to the next. The power supply voltage required by the processors is decreasing (to approximately 1 V) and causing the current drawn to exceed several amperes. As a result, most computer systems are generating more heat causing them to get hotter. Cooling fans, which have become necessary, add to the noise levels. It may be conceivable to split components of the computer into a main chassis and a new expansion (also referred to as a split) chassis. In this arrangement, the expansion chassis accommodates quieter components of the computer and the main chassis retains the hotter and noisier components.

Present techniques to provide power to an expansion and/or split chassis are not simple, and not cost effective. Components of the expansion and/or split chassis such as the expansion cards typically require several watts of power and higher voltages such as 12–15V for operation. Due to the higher power and voltage requirements of these components, presently the interface cards linking the main chassis with the expansion and/or split chassis have been unable to meet their power requirement. For example, 'normal' operating voltages such as 3.3V and 1.5V, which are associated with many standard PC interface cards, are generally not sufficient for operating the components of the expansion and/or split chassis. Therefore, it is common practice to provide an external power adapter module for powering the expansion and/or split chassis. The power adapter module is typically operable to receive AC power from a wall outlet and convert it to various voltages as required by the expansion and/or split chassis. However, the need for the external power adapter module to power the expansion and/or split chassis generally adds to the overall cost, space, clutter, heat and noise.

Therefore, a need exists to provide power to the expansion and/or split chassis more cost effectively and with less clutter, heat and noise. More specifically, a need exists to develop power distribution techniques for powering components of the expansion and/or split chassis with improved simplicity, and reduced cost. Accordingly, it would be desirable to provide tools and techniques for providing power to an expansion and/or split chassis of a computer included in an IHS absent the disadvantages found in the prior methods discussed above.

SUMMARY

The foregoing need is addressed by the teachings of the present disclosure, which relates to a system and method for transferring power from one subsystem to another of a computer via a standard card such as a Newcard. According to one embodiment, in a method and system for transferring power from a first subsystem to a second subsystem of a computer via a Newcard device, a first port of the device having a first connector is used to electrically connect the first subsystem to the device. The first connector includes at least one pin terminal to transfer the power and at least one pin terminal coupled to an SMbus of the computer. A second port of the device having a second connector is used to electrically couple the device to the second subsystem. The second connector includes at least one pin terminal to transfer the power. An identifier stored in the device is read by the first subsystem to uniquely identify the device. In response to the identifier, the first subsystem controls an amount of the power transferred to the device.

In one embodiment, a method for transferring power from a first subsystem to a second subsystem of a computer via a Newcard device includes coupling the device with the first subsystem. A first port of the device having a first connector is electrically coupled to the first subsystem. The first connector includes at least one pin terminal to transfer the power and at least one pin terminal coupled to an SMbus of the computer. The device is coupled to the second subsystem by a second port having a second connector. The second connector includes at least one pin terminal to transfer the power. In response to the coupling, the first subsystem reads an identifier stored in the device via the SMbus to uniquely identify the device. In response to the identifier, the first subsystem controls an amount of the power transferred to the device by adjusting a voltage of the at least one pin terminal of the first connector.

Several advantages are achieved by the method and system according to the illustrative embodiments presented herein. The embodiments advantageously provide for a system and method for transferring power to a new expansion chassis from a main chassis of a computer, which is independent of form factors, is cost effective being standards based, occupies less space, is simple and cost effective because it does not require the user to deploy an external power adapter.

DETAILED DESCRIPTION

The functionality of various devices or components described herein may be implemented as hardware (including firmware and circuits) and/or software, depending on the application requirements.

Many prior art techniques are available to provide power to an expansion chassis of a computer. However, these techniques typically rely on using an external power adapter, which is more costly and often results in more clutter, heat and noise. It would be desirable to provide power to the expansion and/or split chassis more cost effectively and with less clutter, heat and noise. According to one embodiment, in a method and system for transferring power from a first subsystem to a second subsystem of a computer via a Newcard device, a first port of the device having a first connector is used to electrically connect the first subsystem to the device. The first connector includes at least one pin terminal to transfer the power and at least one pin terminal coupled to an SMbus of the computer. A second port of the device having a second connector is used to electrically couple the device to the second subsystem. The second connector includes at least one pin terminal to transfer the power. An identifier stored in the device is read by the first subsystem to uniquely identify the device. In response to the identifier, the first subsystem controls an amount of the power transferred to the device and to the second subsystem.

Figure 1A:
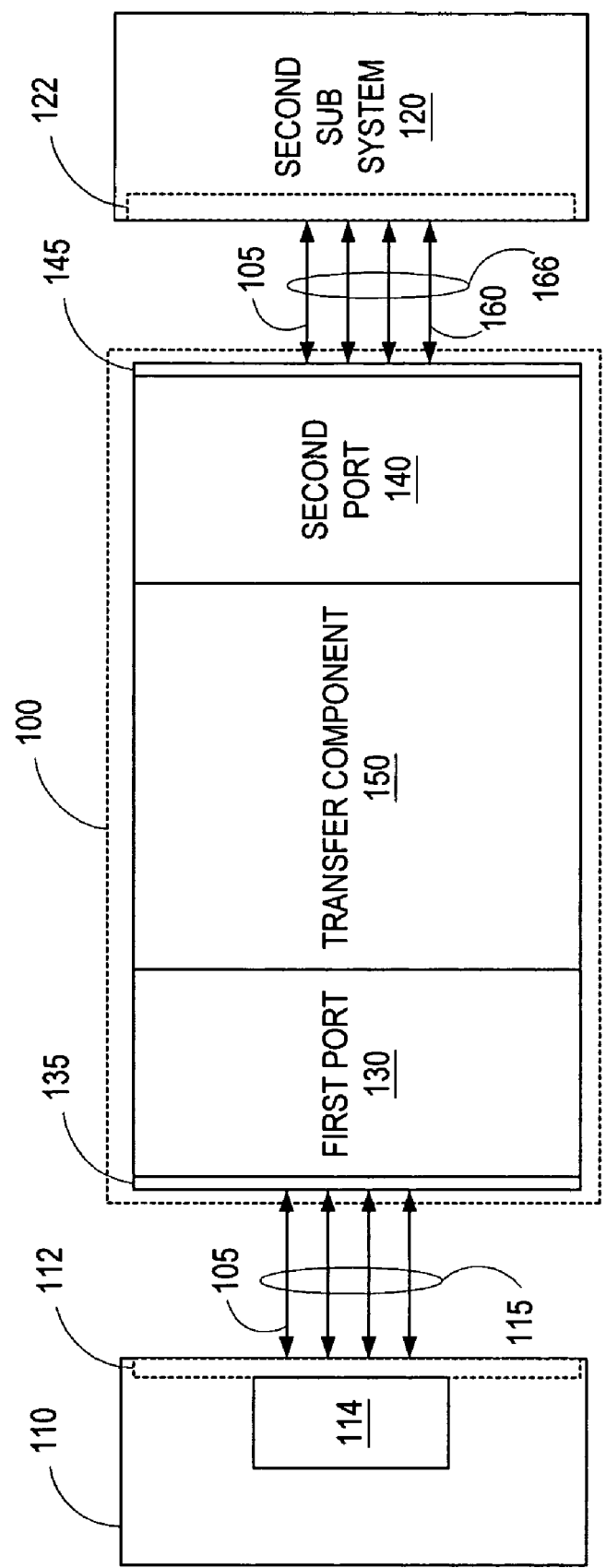
FIG. 1A illustrates a diagrammatic representation of a Newcard device operable to transfer power from a first subsystem to a second subsystem of a computer, according to an embodiment.

FIG. 1A illustrates a diagrammatic representation of a Newcard device 100 operable to transfer power from a first subsystem 110 to a second subsystem 120 of a computer (not shown), according to an embodiment. In one embodiment, the computer is partitioned into the first and second subsystems 110 and 120 based on at least one predefined criteria. For example, components included in the main chassis (not shown) of the computer may be defined to be the first subsystem 110 whereas components included in a new expansion chassis (not shown) may be defined to be the second subsystem 120. Typical components included in the first subsystem 110 may include a controller 114 and a processor (not shown).

In the depicted embodiment, the controller 114 receives instructions from the processor enabling the controller 114 to control the flow of power from the first subsystem 110 to the second subsystem via the Newcard 100. The controller 114 may also be used to control the operation of the Newcard device 100 and expansion cards (not shown) typically included in the expansion chassis. Additional details of the controller 114 is described in FIG. 2.

As another example of segmenting the computer into subsystems, the hotter and noisier nature of components of the computer may be used to partition the subsystems. Components such as the processor and a blower fan assembly (not shown) may be included in the first subsystem 110, whereas remaining components of the computer may be defined to be included in the second subsystem 120. As yet another example, components of the computer that require proximity to the user such as power switches and removable media storage devices may be defined to be included in the second subsystem 120, whereas the remaining components may be included in the first subsystem 110.

In one embodiment, the Newcard device 100 is based on an emerging Newcard standard being developed by PCMCIA (Personal Computer Memory Card International Association). The PCMCIA is a well known international standards organization and trade association that was founded to establish standards for Integrated Circuit (IC) cards and to promote interchangeability among personal computers (PC's). The new format for the Newcard device 100 is based on existing technologies such as PC Card and Universal Serial Bus (USB) 2.0, as well as emerging technologies such as PCI Express (PCIE). The approximate dimensions for the Newcard device are 1.3 inches wide, 3.0 inches long, and 0.2 inches thick. By comparison, a Type II PC Card is 2.2 by 3.4 by 0.2 inches. The Newcard format is applicable for both portable and desktop computing environments.

The Newcard device 100 includes a first port 130 having a first connector 135, a second port 140 having a second connector 145 and a transfer component 150. A connector, in general, includes an electrical device operable to electrically couple or interconnect one device to another. The first and second connectors 135 and 145 are examples of the connector, as described herein. The connector may include traditional male/female coupling type connectors, which are physically as well as electrically coupled. Male/female type connectors are also referred to as plug and socket type connectors and are shaped to mate together in one way. Some connectors may include directly attached connections such as a soldering type connection to achieve the interconnection. Various other types of connectors such as a spring-loaded connector may also be used.

The first port 130 enables unidirectional transfer of power from the first subsystem 110 to the Newcard device 100 and bi-directional communications between the first subsystem 110 of the computer and the Newcard device 100 via multiple links 115. In one embodiment, the first connector 135 is a male-type connector designed to match with a corresponding female-type adapter 112 included in the first subsystem 110. In this embodiment, the combination of the first connector 135 and the matching female-type adapter 112 is consistent with the Newcard format.

In one embodiment, the Newcard device 100 includes communications with a System Management Bus (SMBus) 105. The SMBus 105, which is well known, is used in the IHS for low-speed system management communications. In one embodiment, the connection to the SMBus 105 is included in the first connector 135.

Figure 1B:
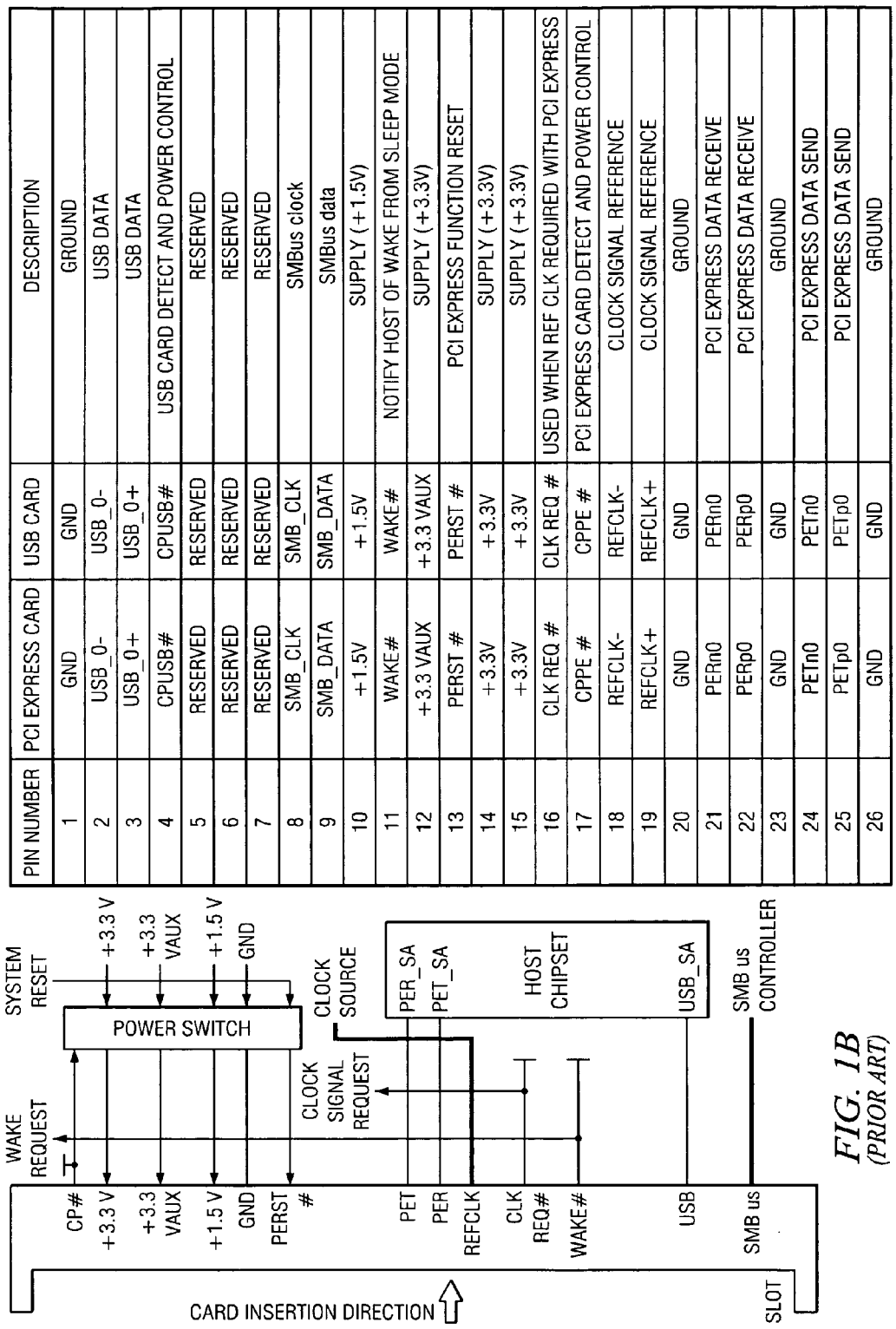
FIG. 1B illustrates a standard configuration arrangement for the 28 pin terminals of a Newcard device, according to prior art.

In one embodiment, the first connector 135 includes multiple pin terminals (not shown) to transfer signals. A first set of pins (not shown), which includes at least one of the multiple pin terminals, is used to transfer the power and a second set of pins (not shown), which includes at least one of the multiple pin terminals, is used for SMbus 105 communications. In one embodiment, the multiple pins of first connector 135 are consistent with a single row of 28 pin terminals in conformance with the Newcard format. In contrast, PC Cards use a double stacked row of 68 pins. FIG. 1B illustrates a standard, well known configuration arrangement for the 28 pin terminals of the first connector 135, the first connector 135 being in conformance with the Newcard format.

Referring back to FIG. 1A, the second port 140 enables unidirectional transfer of power from the Newcard device 100 to the second subsystem 120 and bi-directional communications between the second subsystem 120 of the computer and the Newcard device 100 via multiple links 166. In one embodiment, the second port 140 includes at least one high speed serial communications bus 160. In one embodiment, the second port 140 includes two serial communications busses of which one bus conforms to the PCIE standard and the second bus conforms to the USB 2.0 standard. The typical data transfer rates supported by PCIE and USB are approximately 2.5 gigabits per second and 480 megabits per second respectively.

In one embodiment, to achieve additional power transfer between the first and second subsystems 110 and 120, two or more Newcard devices (not shown), each of which are substantially similar to the Newcard device 100, may be connected in parallel. In one embodiment, to achieve a longer distance between the first and second subsystems 110 and 120, the at least one high speed serial communications bus 160 such as the PCIE bus and/or USB bus may be re-driven on the Newcard device 100.

In one embodiment, the second connector 145 is a male-type connector designed to match with a corresponding female-type adapter 122 included in the second subsystem 120. In one embodiment, the second connector 145 may use a direct connect mechanism such as a soldered connection. Other interconnect means may also be possible.

In one embodiment, the second connector 145 includes multiple pin terminals (not shown) to transfer signals. A first set of pins (not shown), which includes at least one of the multiple pin terminals, is used to transfer the power and a second set of pins (not shown), which includes at least one of the multiple pin terminals, is used for SMbus 105 communications. In one embodiment, the first set of pins may include the reserved pins (pins 5, 6 and 7 of FIG. 1B). In one embodiment, the first set of pins may include the 3.3V and 1.5V pins (pins 14, 15 and pin 10 respectively of FIG. 1B).

In one embodiment, the multiple pin terminals of the second connector 145 are in conformance with the 28-pin arrangement of the Newcard format illustrated in FIG. 1B. At least one of the 28 pins of the second connector 145 is used to transfer power. Additional pin or pins may be used for the at least one high speed serial communications bus 160 signals and/or SMbus 105 communications.

Figure 3A:
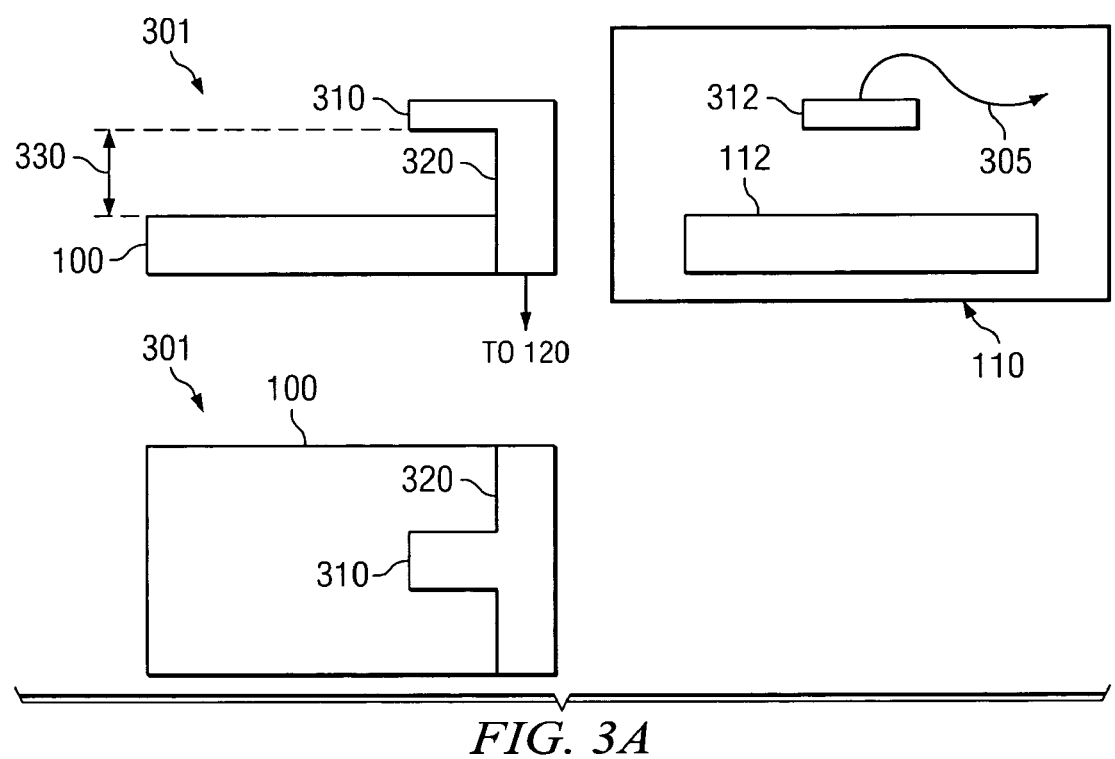
FIG. 3A illustrates a diagrammatic representation of a separate power connector coupled to a Newcard device to transfer power from a first subsystem to a second subsystem of a computer, according to an embodiment.
Figure 3B:
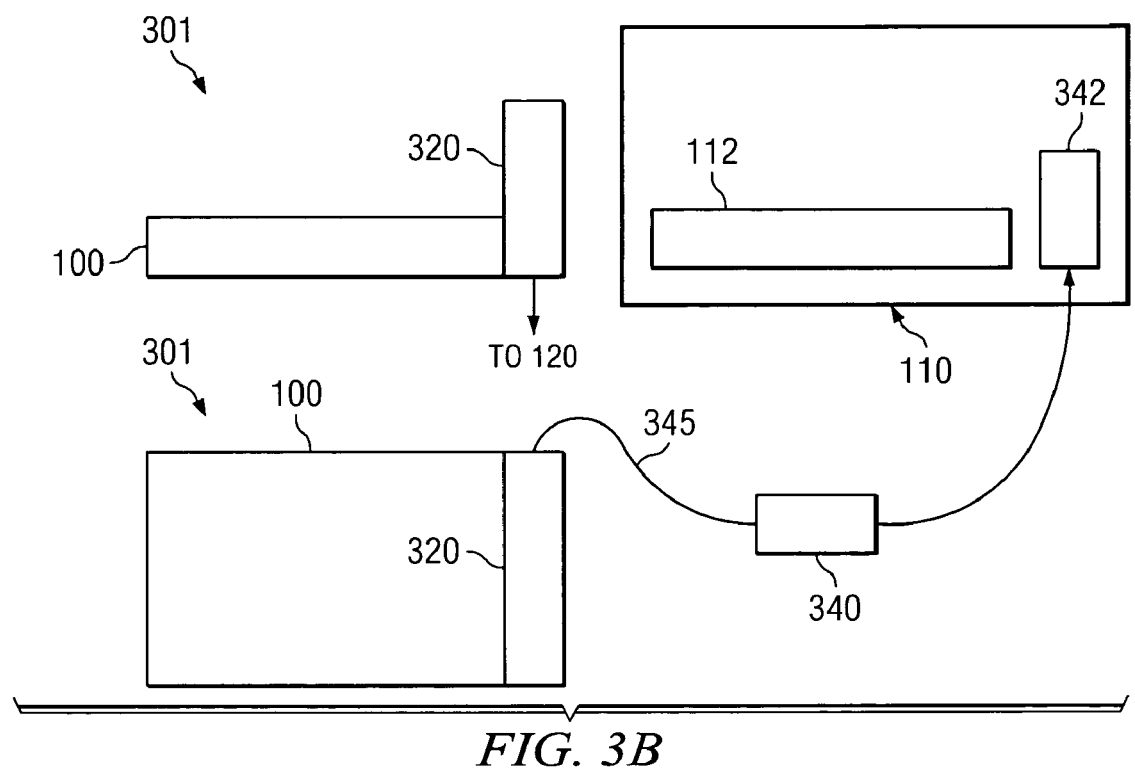
FIG. 3B illustrates another diagrammatic representation of a separate power connector coupled to a Newcard device to transfer power from a first subsystem to a second subsystem of a computer, according to an embodiment.

In one embodiment, the second connector 145 is custom designed to facilitate connections for the power transfer. The custom designed second connector 145 may also include pins for communications such as the at least one serial communications bus 160 and the SMbus 105. In this embodiment, the number of pin terminals required for the connection may vary depending on the application requirements. As described earlier, the first set of pins is used to transfer the power and the second set of pins is used for SMbus 105 communications. Additional details of various techniques to transfer power from the first subsystem 110 to the second subsystem 120, which are independent of the first connector 135, are illustrated in FIGS. 3A and 3B.

In one embodiment, the first connector 135 of the Newcard device 100 is inserted into the corresponding matching female-type adapter 112 included in the first subsystem 110 and the second connector 145 is inserted into the corresponding matching female-type adapter 122 included in the second subsystem 120 to achieve the electrical coupling between the two subsystems 110 and 120 via the Newcard device 100. The transfer of power from the first subsystem 110 to the second subsystem 120 via the Newcard device 100 is enabled in response to the electrical coupling.

In one embodiment, the transfer component 150, which is electrically coupled to the first and second ports 130 and 140, is operable to: a) transfer the power received from the first subsystem 110 to the second subsystem 120 and b) facilitate bi-directional communications between the two subsystems 110 and 120. The transfer component 150 may include conducting material such as copper to receive the power from the first subsystem 110 and transfer it to the second subsystem 120.

Figure 2:
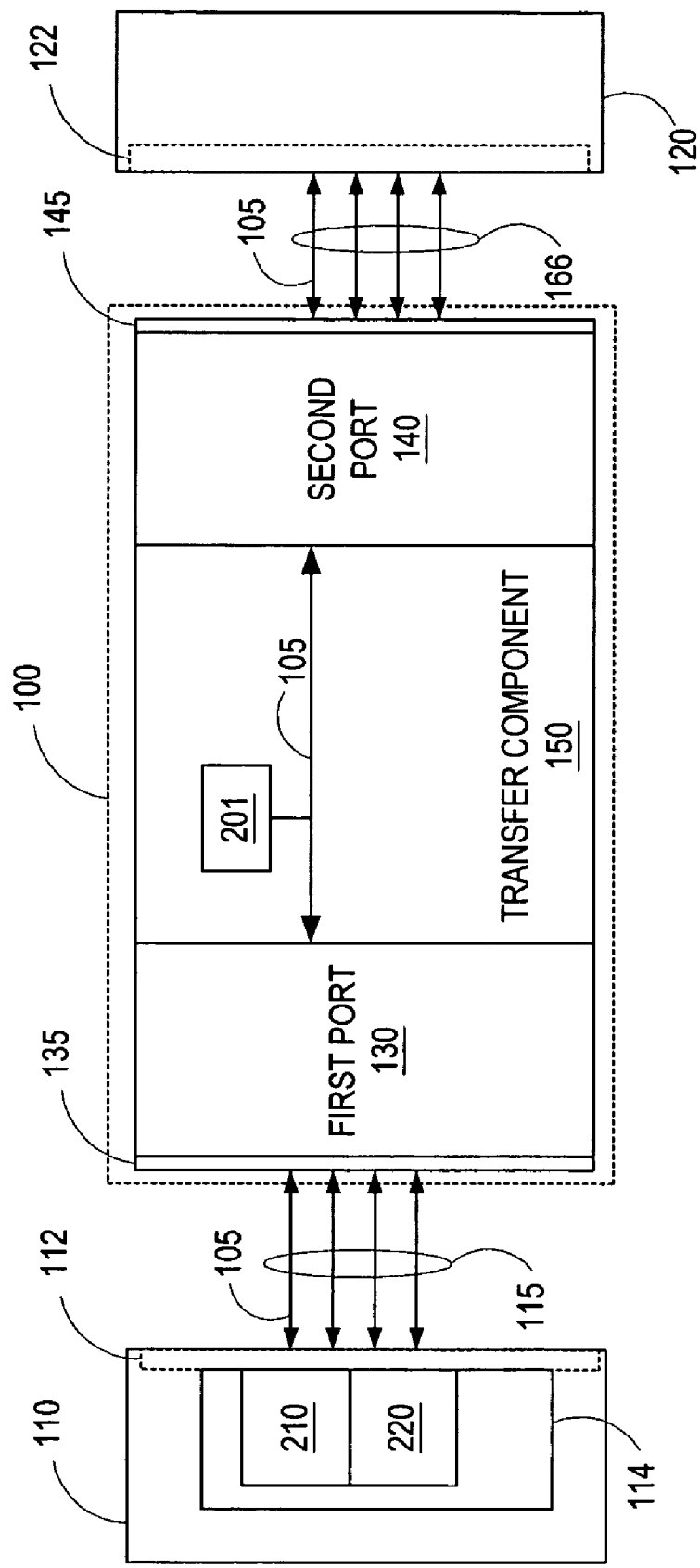
FIG. 2 illustrates a diagrammatic representation of a controller operable to control an amount of power transferred from a first subsystem to a second subsystem of a computer, according to an embodiment.

FIG. 2 illustrates a diagrammatic representation of the controller 114 included in the first subsystem 110 and operable to control an amount of power transferred from the first subsystem 110 to a second subsystem 120, according to an embodiment. In this embodiment, the controller 114 controls the amount of the power being provided to the Newcard device 100. In this embodiment, the controller 114 includes: a) a detection component 210 operable to detect the Newcard device 100 and b) a control component 220 operable to adjust the amount of the power being transferred to the Newcard device 100 in response to the detection of the Newcard device 100. In one embodiment, the control component 220 may include the detection component 210.

When the Newcard device 100 is initially plugged in to a matching receiving slot of the first subsystem 110, that is when the first connector 135 mates with the corresponding adapter 112, electrical connections are established between the first subsystem 110 and the Newcard device 100. In response to the plug in, the detection component 210 of the controller 114 receives identification information from the Newcard device 100 via the SMbus 105. In one embodiment, the identification information, which uniquely identifies the Newcard device 100 on the SMbus 105, is stored in a memory component 201 such as a register in the Newcard device 100. If the detection component 210 of the controller 114 determines that the Newcard device 100 is a particular type of a Newcard, which is operable to transfer power from the first subsystem 110 to the second subsystem 120, then the control component 220 of the controller 114 advantageously adjusts the amount of power transferred to the Newcard device 100 by adjusting the voltage of the first set of pins. As described earlier, the first set of pins may include the reserved pins (pins 5, 6 and 7 of FIG. 1B) and/or may include the 3.3V and 1.5V pins (pins 14, 15 and pin 10 respectively of FIG. 1B).

In one embodiment, the controller 114 dynamically modifies the standard pin functions of the 28-pin Newcard format. For example, voltage level of at least one of the 28-pin format standard for the first connector 135 is advantageously modified to provide power to the second subsystem 120 upon detecting a presence of the particular type of the Newcard. The detection component 210 detects the presence of an expansion chassis and/or split chassis module being powered by the Newcard device 100, by reading a signature or identifier stored in the memory component 201 via the SMBus 105. If an expansion chassis and/or split chassis implementation powered by the Newcard device 100 is detected then the control component 220 adjusts voltage levels suitable for the operation of the components included in the second subsystem 120. Based on the identifier information, if the detection component 210 determines that the Newcard device 100 is not operable to transfer the power then the control component 220 restores the default voltage levels as defined by the Newcard standard.

In one embodiment, the control component 220 advantageously adjusts the voltage levels of the reserved pins (pins 5, 6 and 7 of FIG. 1B) by asserting 12V and GND on to a combination of the reserved pins or pins 1 or 2, 3.3V pins (pins 14, 15 of FIG. 1B), depending on the application. An optional 5V signal may be asserted onto the 1.5V pin (pin 10 of FIG. 1B). The amount of power required and the number of pins switched may depend on the information read from the Newcard device 100 via the SMbus 105. Upon removal of the Newcard device 100, the detection component 210 detects the removal and the control component 220 adjusts the voltage level for pins 5–7, 10, and 14–15 to the standard level.

In one embodiment, in a double wide implementation (not shown) of the Newcard device 100, the 3.3V pins and the 1.5V pin on the $2^{nd}$ slot may be used for adjusting the voltages. The control component 220 provides 12V to the 3.3V pins (pins 14,15 of FIG. 1B) of the $2^{nd}$ Newcard slot to provide additional power to the second subsystem 120. An optional 5V signal may be asserted onto the 1.5V pin (pin 10 of FIG. 1B).

FIG. 3A illustrates a diagrammatic representation of a separate power connector 310 coupled to the Newcard device 100 in various views to transfer power from the first subsystem 110 to a second subsystem 120, according to an embodiment. In this embodiment, power is received from the first subsystem 110 via the separate power connector 310. In the depicted embodiment, the power transfer arrangement is independent of the first connector 135. The separate power connector 310 is coupled to the Newcard device 100 by an extended module member 320 forming a powered Newcard assembly 301. The extended module member 320 is electrically coupled to the Newcard device 100 and to the second subsystem 120.

The extended module member 320 resembles a rectangular prism having a length L, a width W and a depth D. These dimensions are generally consistent with the Newcard format but may vary depending of the manufacturer. In this embodiment, the extended module member 320 is placed substantially perpendicular to the Newcard device 100. The separate power connector 310 is in a plane, which is substantially parallel to the Newcard device 100 and substantially perpendicular to the extended module member 320. A vertical distance 330 separates the separate power connector 310 and the Newcard device 100. The vertical distance 330 may be adjusted depending on the size of the separate power connector 310.

In this embodiment, the powered Newcard assembly 301 is inserted in the corresponding mating slots to establish substantially concurrent connections. That is, when the Newcard device 100 is inserted in the corresponding adapter 112, the separate power connector 310 is also automatically inserted in a corresponding adapter 312 to establish electrical coupling. Power is transferred from a power supply system (not shown) of the first subsystem 110 to the adapter 312 by a cable 305, and from the adapter 312 to the separate power connector 310 to the extended module member 320 and finally to the second subsystem 120. In one embodiment, the power supply system is operable to provide 12V and 5V and is controllable by the controller 114.

In one embodiment, the extended module member 320 may be substantially similar to the customized version of the second connector 145 and is designed to facilitate connections for the power transfer.

FIG. 3B illustrates a diagrammatic representation of a separate power connector 340 coupled to the Newcard device 100 in various views to transfer power from the first subsystem 110 to a second subsystem 120, according to an embodiment. In this embodiment, power is received from the first subsystem 110 via the separate power connector 340 and a cable 345. In the depicted embodiment, the power transfer arrangement is independent of the first connector 135. The cable 345 is connected to an extended module member 320 of the Newcard device 100 to form a powered Newcard assembly 301. The extended module member 320 is electrically coupled to the Newcard device 100 and to the second subsystem 120.

The extended module member 320 resembles a rectangular prism having a length L, a width W and a depth D. These dimensions are generally consistent with the Newcard format but may vary depending of the manufacturer. In this embodiment, the extended module member 320 is placed substantially perpendicular to the Newcard device 100. The separate power connector 340 is inserted into a corresponding adapter 342 included in the first subsystem 110.

In this embodiment, the powered Newcard assembly 301 is inserted in the corresponding mating slots to establish connections. That is, the Newcard device 100 is inserted in the corresponding adapter 112, and the separate power connector 340 is also separately inserted in the corresponding adapter 342 to establish an electrical coupling. Power is transferred from a power supply system (not shown) of the first subsystem 110 to the adapter 342 by a cable (not shown), and from the adapter 342 to the separate power connector 340 to the extended module member 320 via the cable 345 and finally to the second subsystem 120. In one embodiment, the power supply system is operable to provide 12V and 5V and is controllable by the controller 114.

In one embodiment, the extended module member 320 may be substantially similar to the customized version of the second connector 145 and is designed to facilitate connections for the power transfer.

Figure 4:
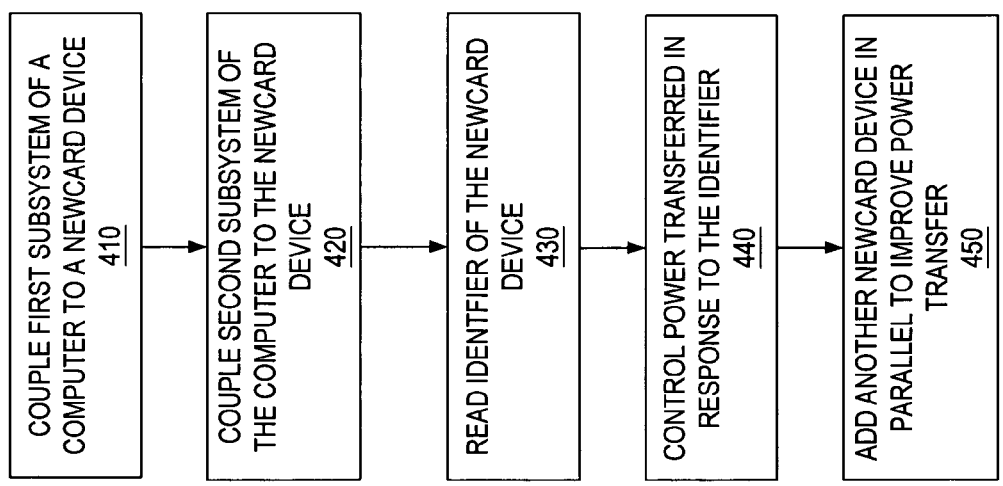
FIG. 4 is a flow chart illustrating a method for transferring power from a first subsystem to a second subsystem of a computer via a Newcard device, according to an embodiment.

FIG. 4 is a flow chart illustrating a method for transferring power from a first subsystem to a second subsystem of a computer via a Newcard device, according to an embodiment. In step 410, the first subsystem 110 is electrically coupled to the Newcard device 100 by the first port 130 having the first connector 135. In one embodiment, the first connector 135 includes at least one pin terminal to transfer the power and at least one pin terminal coupled to the SMbus 105 of the computer. In one embodiment, the coupling of the first subsystem to the device includes electrically connecting a separate power connector connected to a source of the power included in the first subsystem. The separate power connector is coupled to the extended module member 320 by a cable external to the device 100. The extended module member 320 is coupled to the second subsystem 120 to transfer the power. In this embodiment, the power transferred from the first subsystem 110 to the second subsystem 120 is independent of the first connector 135.

In step 420, the second port 140 of the Newcard device 100 having the second connector 145 is used to electrically couple the device 100 to the second subsystem 120. In one embodiment, the second connector 145 includes at least one pin terminal to transfer the power.

In step 430, an identifier stored in the memory component 201 of the Newcard device 100 is read to uniquely identify the device 100. In one embodiment, the reading is performed by the detection component 310 via the SMbus 105. In step 440, the power transferred to the Newcard device 100 is controlled in response to the identifier. In one embodiment, the controlling is performed by the control component 220 of the first subsystem 110. The control component 220 controls the power transferred by adjusting a voltage of the at least one pin terminal of the first connector 135.

Various steps described above may be added, omitted, combined, altered, or performed in different orders. For example, step 450 may be added so that another Newcard device, which is substantially similar to the Newcard device 100, is coupled in parallel to achieve additional transfer of power between the first and second subsystems 110 and 120.

Figure 5:
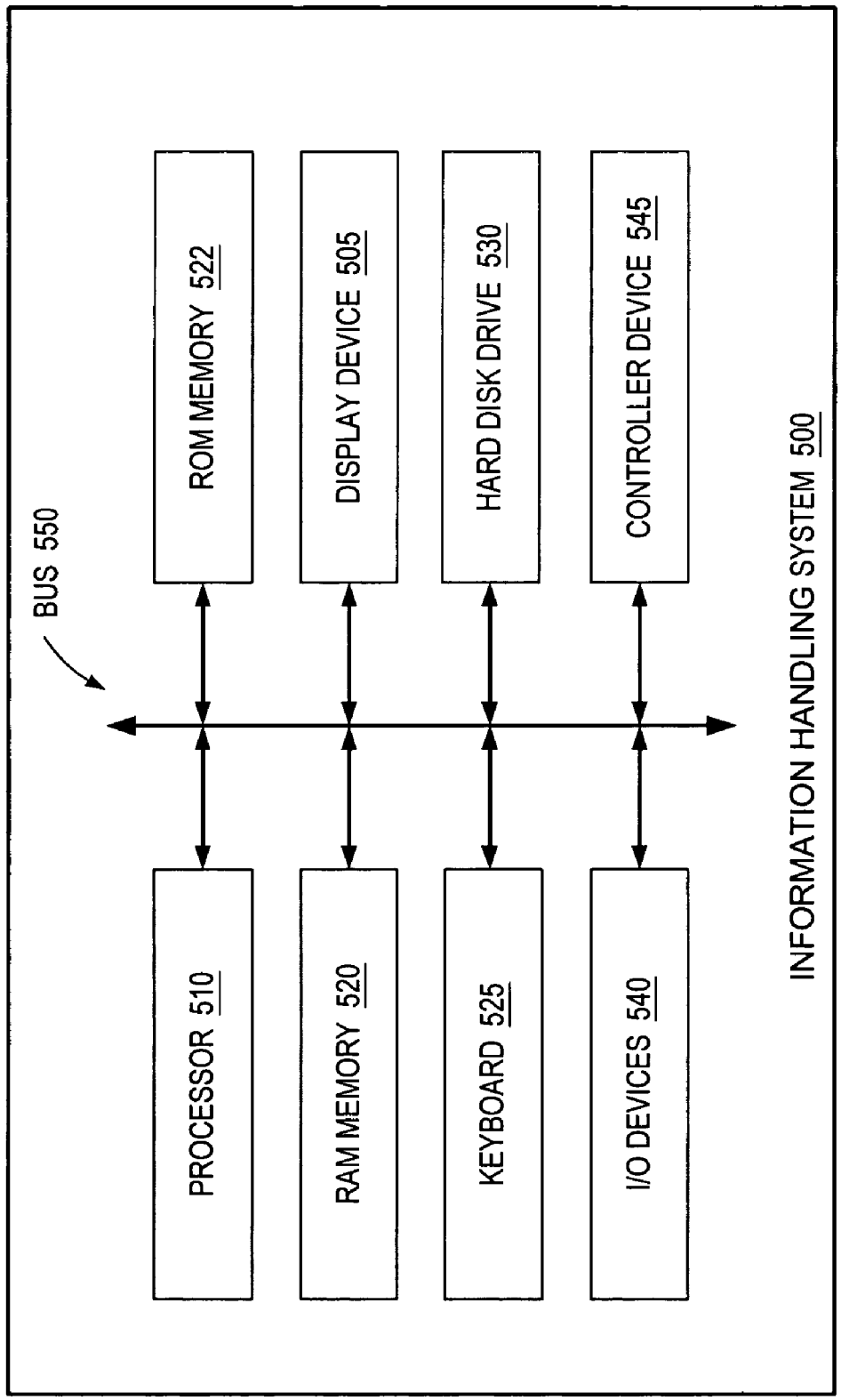
FIG. 5 illustrates a block diagram of an information handling system to implement method or apparatus aspects of the present disclosure, according to an embodiment.

FIG. 5 illustrates a block diagram of an information handling system to implement method or apparatus aspects of the present disclosure, according to an embodiment. For purposes of this disclosure, an information handling system 500 may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, the information handling system 500 may be a personal computer, including notebook computers, personal digital assistants, cellular phones and gaming consoles, a network storage device, or any other suitable device and may vary in size, shape, performance, functionality, and price.

The information handling system 500 may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Referring to FIG. 5, the information handling system 500 includes a processor 510, a system random access memory (RAM) 520, a system ROM 522, a display device 505, a keyboard 525 and various other input/output devices 540. It should be understood that the term "information handling system" is intended to encompass any device having a processor that executes instructions from a memory medium. The information handling system 500 is shown to include a hard disk drive 530 connected to the processor 510 although some embodiments may not include the hard disk drive 530. The processor 510 communicates with the system components via a bus 550, which includes data, address and control lines. A controller device 545, such as the controller 114, may be connected to the bus 550 to enable information exchange between the system 500 and other devices or subsystems.

In one embodiment, the information handling system 500 may be used to implement the computer described in FIG. 1. The processor 510 is operable to execute the computing instructions and/or operations of the information handling system 500. The memory medium, e.g., RAM 520, preferably stores instructions (also known as a "software program") for implementing various embodiments of a method in accordance with the present disclosure. The memory medium may include the memory component 201. In various embodiments the one or more software programs are implemented in various ways, including procedure-based techniques, component-based techniques, and/or object-oriented techniques, among others. Specific examples include assembler, C, XML, C++ objects, Java and Microsoft Foundation Classes (MFC).

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A Newcard device operable to transfer power from a first subsystem to a second subsystem of a computer, the Newcard device comprising:
   a first port electrically coupled to the first subsystem by a first connector, wherein the first connector includes at least one pin terminal to transfer the power and at least one pin terminal coupled to a System Management Bus (SMbus) of the computer;
   a second port electrically coupled to the second subsystem by a second connector, wherein the second connector includes at least one pin terminal to transfer the power;
   a transfer component electrically coupled to the first and second ports, wherein the transfer component is operable to transfer the power;
   a memory component electrically coupled to the SMbus, the memory component storing an identifier to uniquely identify the device, wherein an amount of the power received by the device is adjusted in response to the identifier;

a detection component operable to detect the device; and
a control component operable to dynamically adjust the amount of the power transferred to the at least one pin terminal of the first connector in response to the detection of the device.

2. The device of claim 1, wherein the detection component reads the identifier via the SMbus to detect the device.

3. The device of claim 1, wherein the control component adjusts the amount of power by adjusting a voltage of the at least one pin terminal of the first connector.

4. The device of claim 1, wherein the computer is partitioned into the first and second subsystems based on at least one predefined criteria.

5. The device of claim 1, wherein the first connector includes 28 pins.

6. The device of claim 5, wherein a first set of at least one of the 28 pins includes the at least one pin terminal to transfer the power and a second set of at least one of the 28 pins includes the at least one pin terminal coupled to the SMbus.

7. The device of claim 1, wherein the first and second subsystems are coupled by two Newcard devices, wherein the two Newcard devices are substantially identical.

8. A method for transferring power from a first subsystem to a second subsystem of a computer via a Newcard device, the method comprising:
coupling the first subsystem to the device, wherein the coupling includes electrically connecting a first port of the device to the first subsystem by a first connector;
coupling the device to the second subsystem, wherein the coupling includes electrically connecting a second port of the device to the second subsystem by a second connector;
reading an identifier stored in the device to uniquely identify the device; and
dynamically controlling the power transferred to the device in response to the identifier;
wherein the reading is performed by a detection component of the first subsystem and the controlling is performed by a control component of the first subsystem.

9. The method of claim 8, wherein the coupling of the first subsystem to the device further includes electrically connecting a separate power connector connected to a source of the power included in the first subsystem, wherein the separate power connector is coupled to an extended module member by a cable external to the device, wherein the extended module member is coupled to the second subsystem to transfer the power.

10. The method of claim 8, wherein the power transferred from the first subsystem to the second subsystem is independent of the first connector.

11. The method of claim 8, wherein the second connector includes at least one pin terminal to transfer the power.

12. The method of claim 8, wherein the first connector includes at least one pin terminal to transfer the power and at least one pin terminal coupled to an SMbus of the computer.

13. The method of claim 8, wherein the detection component reads the identifier via the SMBus.

14. The method of claim 8, wherein the control component controls the power transferred by dynamically adjusting a voltage of at least one pin terminal of the first connector.

15. The method of claim 8, wherein the computer is partitioned into the first and second subsystems based on at least one predefined criteria.

16. The method of claim 8, wherein the first connector includes 28 pins.

17. The method of claim 16, wherein a first set of at least one of the 28 pins includes the at least one pin terminal to transfer the power and a second set of at least one of the 28 pins includes the at least one pin terminal coupled to the SMbus.

18. The method of claim 8, wherein the power is transferred from the first to the second subsystem by two Newcard devices, wherein the two devices are substantially identical.

19. An information handling system comprising:
a first subsystem, wherein the first subsystem is defined to include:
a processor;
a system bus; and
a memory coupled to the processor through the system bus;
a second subsystem, wherein the second subsystem is defined to include at least one expansion card; and
a Newcard device operable to transfer power from the first subsystem to the second subsystem, wherein the device includes:
a first port electrically coupled to the first subsystem by a first connector, wherein the first connector includes at least one pin terminal to transfer the power and at least one pin terminal coupled to a System Management Bus (SMbus) of the system;
a second port electrically coupled to the second subsystem by a second connector, wherein the second connector includes at least one pin terminal to transfer the power;
a transfer component electrically coupled to the first and second ports, wherein the transfer component is operable to transfer the power;
a memory component electrically coupled to the SMbus, the memory component storing an identifier to uniquely identify the device, wherein the first subsystem reads the identifier and adjusts an amount of the power transferred to the device in response to the identifier;
a detection component operable to detect the device; and
a control component operable to dynamically adjust the amount of the power transferred to the at least one pin terminal of the first connector in response to the detection of the device.

20. The system of claim 19, wherein the first subsystem adjusts the amount of power by dynamically adjusting a voltage of the at least one pin terminal of the first connector.

21. The system of claim 19, wherein the power is transferred from the first to the second subsystem by two Newcard devices, wherein the two devices are substantially identical.

22. An information handling system comprising:
a first subsystem, wherein the first subsystem is defined to include:
a processor;
a storage coupled to the processor; and
a memory coupled to the processor;
a second subsystem, wherein the second subsystem is defined to include at least one expansion card; and
a Newcard device operable to transfer power from the first subsystem to the second subsystem, wherein the device includes:
a first port electrically coupled to the first subsystem by a first connector, wherein the first connector includes at least one pin terminal to transfer the power and at least one pin terminal coupled to a System Management Bus (SMbus) of the system;

a second port electrically coupled to the second subsystem by a second connector, wherein the second connector includes at least one pin terminal to transfer the power;

a transfer component electrically coupled to the first and second ports, wherein the transfer component is operable to transfer the power;

a memory component electrically coupled to the SMbus, the memory component storing an identifier to uniquely identify the device, wherein the first subsystem reads the identifier and adjusts an amount of the power transferred to the device in response to the identifier;

a detection component operable to detect the device; and a control component operable to dynamically adjust the amount of the power transferred to the at least one pin terminal of the first connector in response to the detection of the device.

* * * * *